United States Patent [19]

Miyagawa

[11] Patent Number: 5,759,155
[45] Date of Patent: Jun. 2, 1998

[54] OPTICAL ROTARY ENCODER DEVICE AND AN APPARATUS USING THE SAME

[75] Inventor: Toyomi Miyagawa, Chigasaki, Japan

[73] Assignee: Kabushiki Kaisha Toshiba, Kawasaki, Japan

[21] Appl. No.: 909,878

[22] Filed: Aug. 12, 1997

Related U.S. Application Data

[63] Continuation of Ser. No. 533,546, Sep. 25, 1995, abandoned.

[30] Foreign Application Priority Data

Sep. 30, 1994 [JP] Japan .................... 6-238269
Sep. 30, 1994 [JP] Japan .................... 6-261377

[51] Int. Cl.$^6$ .................................................. A61B 8/00
[52] U.S. Cl. ................................................... 600/459
[58] Field of Search ..................... 128/662.03, 662.06, 128/660.09, 660.1; 250/231.18, 231.14; 364/463; 73/634, 460, 462, 464, 466; 369/32, 47, 54; 600/445, 446, 459, 462

[56] References Cited

U.S. PATENT DOCUMENTS

| | | |
|---|---|---|
| 3,985,448 | 10/1976 | Wiklund et al. . |
| 4,391,282 | 7/1983 | Ando et al. . |
| 4,531,412 | 7/1985 | Prud'Hon et al. . |
| 4,664,121 | 5/1987 | Sanghvi et al. .......... 128/660.09 |
| 4,958,290 | 9/1990 | Kendall et al. .......... 364/463 |
| 5,336,884 | 8/1994 | Khoshnevisan et al. ....... 250/231.18 |
| 5,427,107 | 6/1995 | Milo et al. ............... 128/662.06 |
| 5,473,584 | 12/1995 | Oshima ................... 369/32 |

FOREIGN PATENT DOCUMENTS

| | | |
|---|---|---|
| 0 210 825 | 2/1987 | European Pat. Off. . |
| 0 263 888 | 4/1988 | European Pat. Off. . |
| 0 292 151 | 11/1988 | European Pat. Off. . |
| 62-82944 | 4/1987 | Japan . |

OTHER PUBLICATIONS

Patent Abstracts of Japan, vol. 8, No. 153 (P–287), Jul. 17, 1984, JP-A-59 051 307, Mar. 24, 1984.
Patent Abstracts of Japan, vol. 9, No. 320 (P–413) [2043], Dec. 14, 1985, JP-A-60 146113, Aug. 1, 1985.

*Primary Examiner*—George Manuel
*Attorney, Agent, or Firm*—Oblon, Spivak, McClelland, Maier & Neustadt, P.C.

[57] ABSTRACT

An optical rotary encoder device comprises a disk which has first and second sections differing in the amount of reflected light formed alternately on its entire periphery, the first sections being made up of high reflectivity sections in a specific angular portion in a 360-degree range and low reflectivity sections in the remaining angular portion in the 360-degree range, a light projection/reception section which is positioned so as to face the disk and projects and receives light onto and from the first and second sections on the disk, and rotating mechanism which rotates the disk and the light projection/reception section relatively.

44 Claims, 11 Drawing Sheets

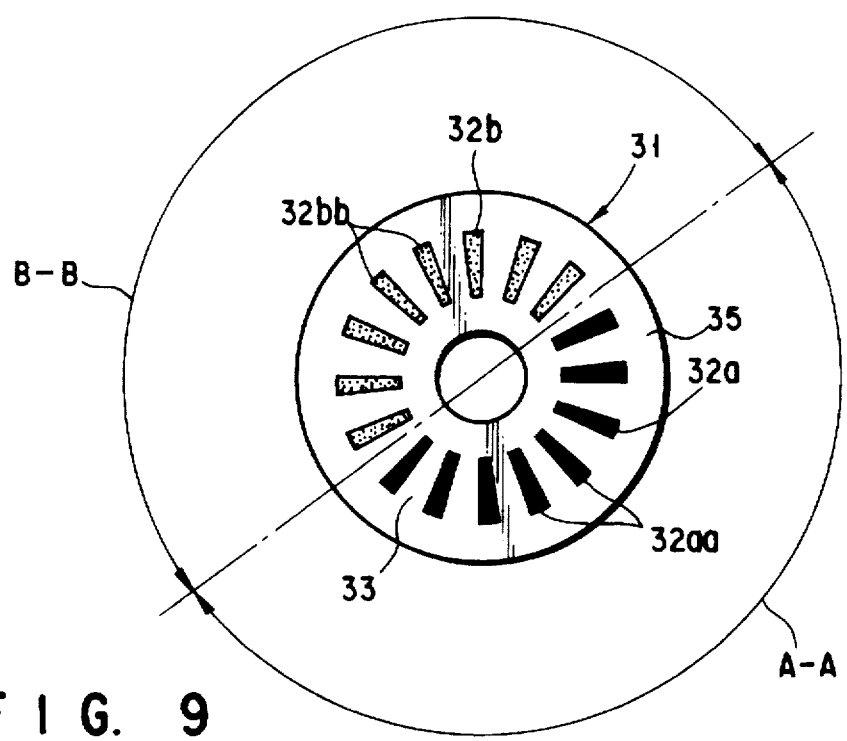
F I G. 9
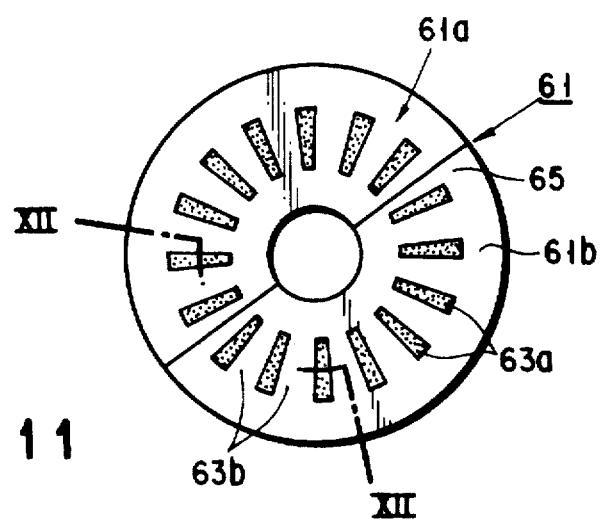
F I G. 11
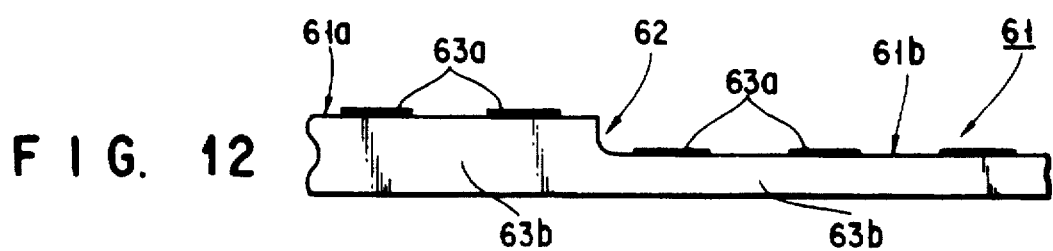
F I G. 12

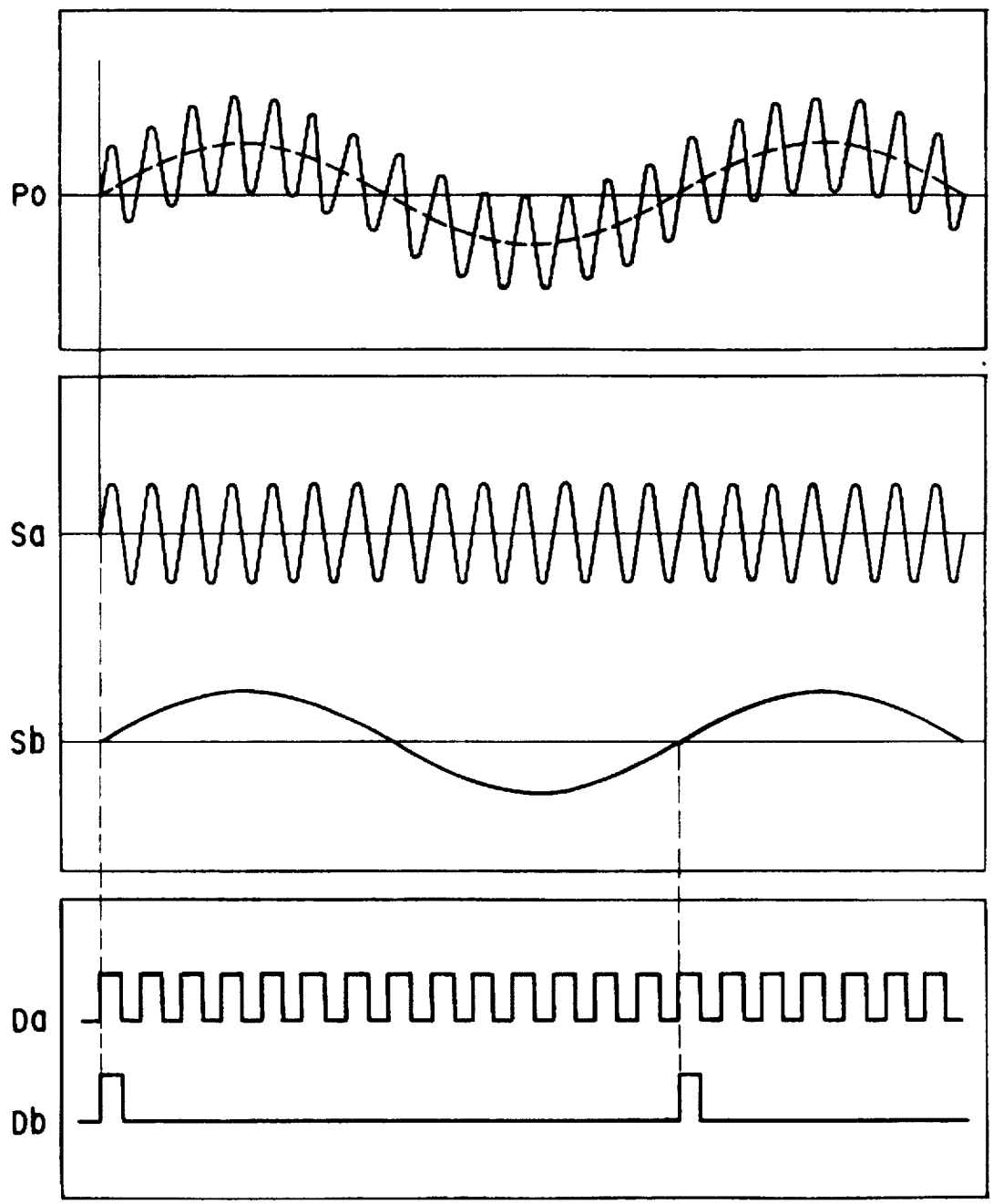
F I G. 10

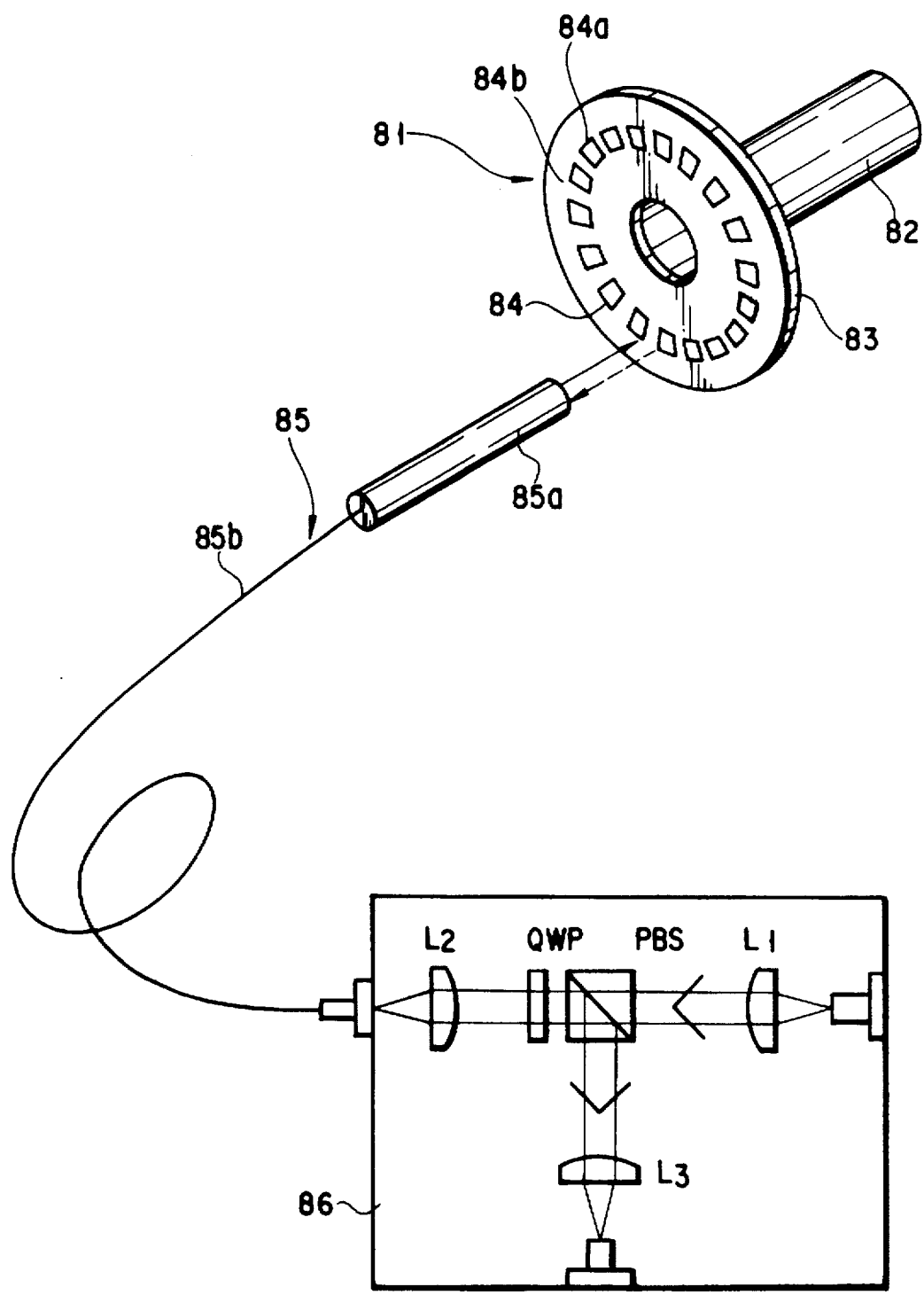
F I G. 13

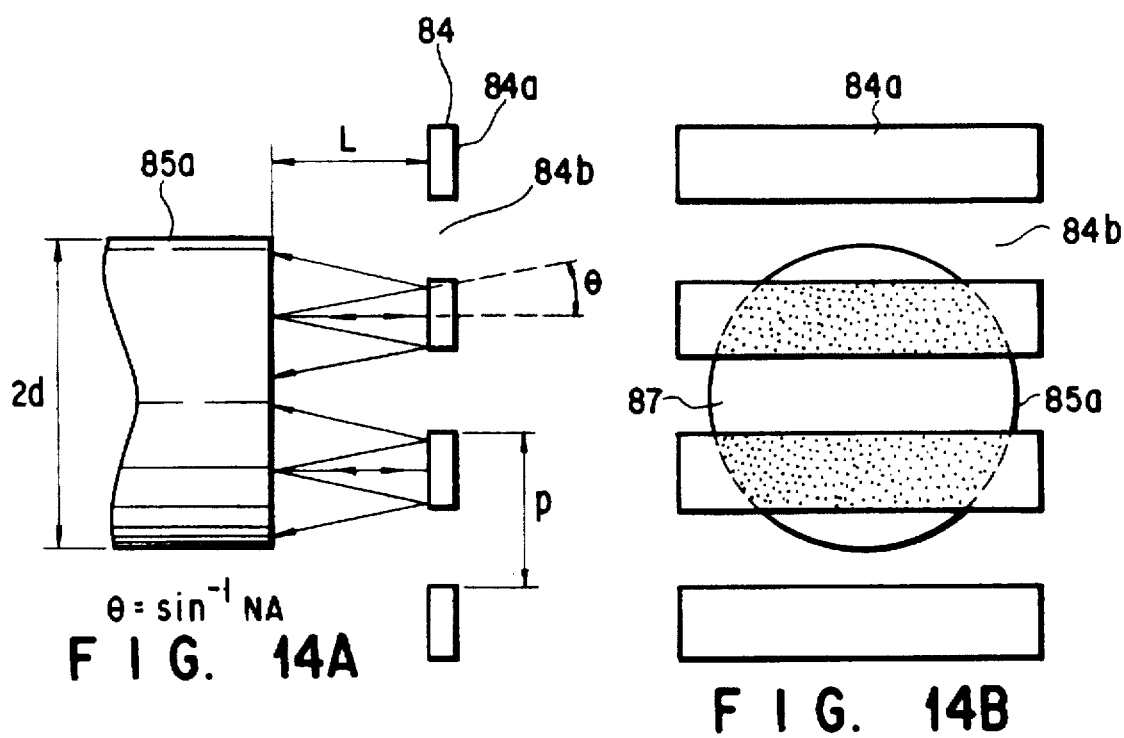
F I G. 14A    $\theta = \sin^{-1} NA$
F I G. 14B
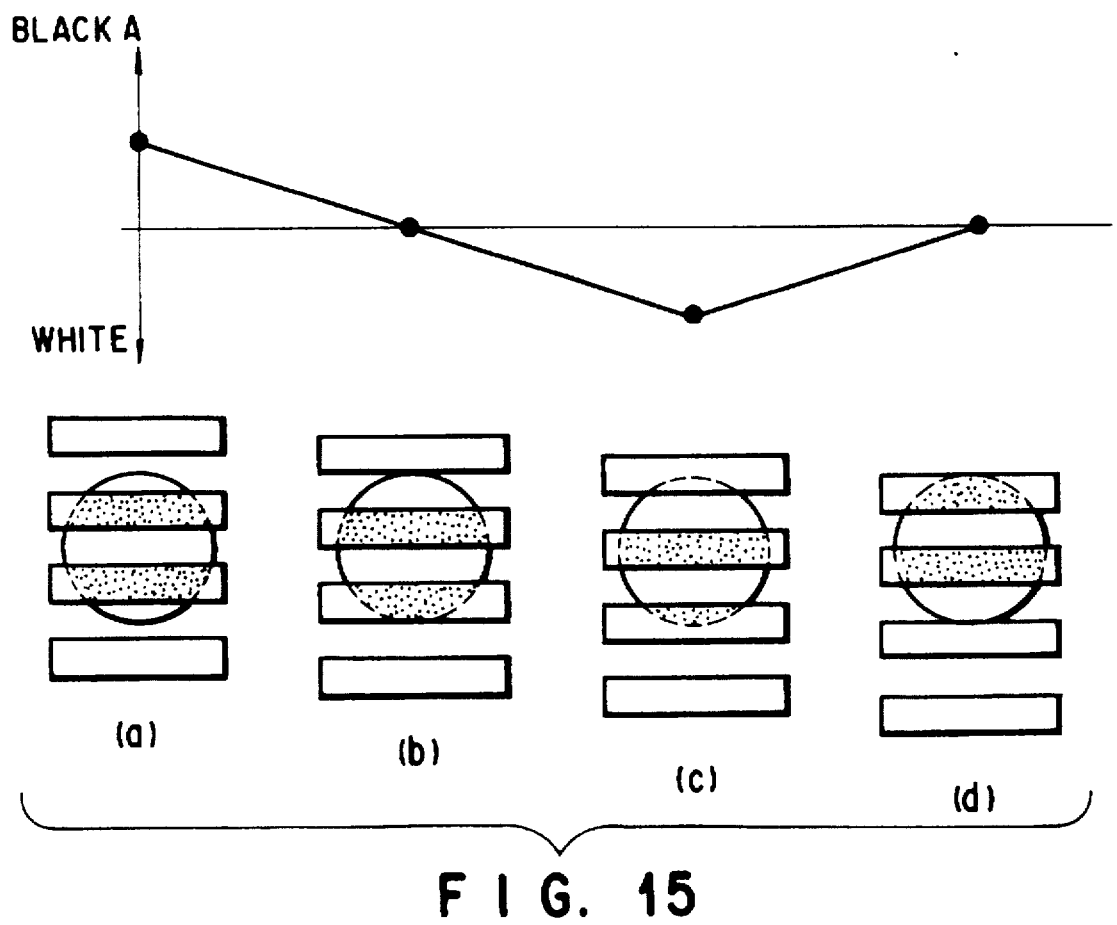
F I G. 15

OPTICAL ROTARY ENCODER DEVICE AND AN APPARATUS USING THE SAME

Continuation of application Ser. No. 08/533,546, filed on Sep. 25, 1995 now abandoned.

BACKGROUND OF THE INVENTION

1. Field of the Invention

This invention relates to an optical rotary encoder device provided on a subminiature rotating machine such as a mechanical scanning ultrasonic probe of an ultrasonographic apparatus, and an apparatus using the encoder device.

2. Description of the Related Art

Some ultrasonic diagnostic apparatuses are provided with a coelomic ultrasonic probe that is inserted in the body cavity to view the inside of internal organs. One type of coelomic ultrasonic probe is a mechanical scanning ultrasonic probe disclosed in, for example, Jpn. UM Appln. KOKOKU Publication No. 62-7301.

This type of mechanical scanning ultrasonic probe comprises an ultrasonic transducer section, a rotating mechanism section, and an encoder section. An example of a mechanical scanning ultrasonic probe using a reflection-type rotary encoder device as an encoder section will be explained with reference to FIG. 1. In FIG. 1, in an ultrasonic probe, an ultrasonic scanning member 2 is placed inside the tip of a flexible tubular casing 1 and an ultrasonic vibrator 3 serving as an ultrasonic transducer section is provided in the ultrasonic scanning member 2. One end of a rotating shaft 4 which, serving as a rotating mechanism section, is located on the axis of the tubular casing 1 is secured to the ultrasonic scanning member 2. The other end of the rotating shaft 4 is connected to a motor (not shown), serving as a rotating mechanism. Therefore, as the motor rotates, the ultrasonic scanning member 2 rotates together with the rotating shaft 4 inside the tubular casing 1. On the rotating shaft 4, a disk 6 with a signal generating face 5 is secured, the signal generating face being made up of reflecting sections differing in the amount of reflected light, arranged alternately. The disk 6 rotates together with the ultrasonic vibrator 3.

Near the inner periphery of the tubular casing 1, a light-projecting optical fiber 7 and light-receiving optical fibers 8, 9 are provided along the rotating shaft 4. The disk 6 and optical fibers 7, 8, 9 are an encoder section and constitutes a sensing section of a reflection-type rotary encoder device. The light-projecting optical fiber 7 directs the light beam from a light projection/reception section 12 and an optical system 13 and projects a light beam at its end onto the signal generating face 5 of the disk 6. The disk 6 and light-receiving optical fibers 8, 9 direct the rotational angle information and reference position information about the rotating shaft 4. The reference position information is the information about the position of the origin of the rotational motion on the signal generating face 5. The ultrasonic driving signal that drives the ultrasonic vibrator 3 and the ultrasonic reception signal reflected by a body cavity 11 are transmitted to the ultrasonic device body (not shown) via a signal cable 10 running through the rotating shaft 4.

As the disk 6 rotates, the optical signal that is reflected by the signal generating face 5 and received at the ends of the light-receiving optical fibers 8, 9 varies in intensity with respect to time. The optical signal provides the rotational angle of the rotating shaft 4 and the information about the rotation of the reference position.

The output terminals of the light-receiving optical fibers 8, 9 are connected to a control section (not shown) for a motor (not shown) that drives the rotating shaft 4. The disk 6, the light-projecting optical fiber 7, the light-receiving optical fibers 8, 9, and the control section for the motor that drives the rotating shaft 4 form a closed loop so that the rotational angle of the rotating shaft 4 can be controlled on the basis of the information about rotation.

With conventional ultrasonic probes, however, to output the reference position information and the rotational angle information independently, a reference position information reflecting section and a rotational angle information reflecting section are formed on the disk and pieces of the information from these sections are outputted by separate optical fibers. Specifically, the rotational angle information reflecting section and the reference position information reflecting section used as a reference for the rotational angle are formed independently in different positions spaced apart radially from the axis of the rotating shaft. This causes the problem that the tip of the insert section of the ultrasonic probe becomes larger, although the probe is required to be smaller in diameter for easy insertion into the body cavity.

Ultrasonic probes use optical fiber to transmit signals. Since an ultrasonic probe is inserted in the body, the optical fiber is often bent and therefore the signal transmission characteristic of the optical fiber is liable to fluctuate, with the result that the signal intensity is liable to vary. On account of this, with conventional ultrasonic probes that obtain the reference position information from the signal intensity, for example, there is the danger that the reference position information will be counted erroneously in such a manner that an angular position of 30 degrees in the second rotation is mistaken for an angular position of 30 degrees in the third rotation.

Another type of optical rotary encoder device for use with the mechanical scanning ultrasonic probe is a transmission-type rotary encoder device. A mechanical scanning ultrasonic probe provided with a transmission-type rotary encoder device is explained with reference to FIG. 2. In FIG. 2, a scale 71 is composed of a rotating scale 71a and a fixed scale 71b. The rotating scale 71a rotates on a shaft 72. Optical slits 75a are made in the outer periphery portion of the rotating scale 71a. The fixed scale 71b is located so that its face may be in parallel with that of the rotating scale 71a. Optical slits 75b with the same pitch as that of the optical slits 75a in the rotating scale 71a are made in the fixed scale. The rotating scale 71a is secured to the shaft 72 by means of a ring 73.

An optical sensor 74 is such that a light-projecting element 74a and a light-receiving element 74b are arranged so as to sandwich the scale 71 between them. The emitted light first passes through the slits 75a in the rotating scale 71a and then through the slits 75b in the fixed scale 71b and enter the light-receiving element 74b. When the slits 75a in the rotating scale 71a coincide with the slits 75b in the fixed scale 71b, the most light reaches the light-receiving element 74b. When they do not coincide with each other, the light is less apt to enter the light-receiving element 74b.

A change in the amount of light received is shown in FIGS. 3A to 3C and 4A and 4B. The amount of light received by the light-receiving element 74b is the largest when the position of the slits 75a coincides with the position of the slits 75b as shown in FIG. 3A. When the position of the slits 75a shifts from the position of the slits 75b by one pitch as shown in FIG. 3C, almost no light is received and the amount of light received becomes the smallest. Use of the fixed scale 71b can make the minimum amount of light zero theoretically as shown in FIG. 4A, even if the range of light projected on the rotating scale 71a is greater than one pitch of the slits 75a. Reference symbol 51 in FIG. 4A indicates the amount of light in the case of FIG. 3A, symbol 52 in FIG. 4A the amount of light in the case of FIG. 3B, and symbol 53 in FIG. 4A the amount of light in the case of FIG. 3C. Because the amplitude of the amount of light that increases and decreases becomes large, the signal-to-noise ratio can be improved. The projection range of the light projected from the light-projecting element 74a requires no fine adjustment.

In contrast, even a configuration without a fixed scale can sense the presence/absence of slits. This can be done by making the projection range of the light projected on the rotating scale 71a narrower than the width of the slits 75a or by adjusting the number of the slits 75a present in the area on which the light is projected. A change in the amount of light received is shown in FIG. 4B. The portion indicated by symbol 54 in FIG. 4B shows that the amount of light becomes the largest in the case where there are three slits 75a between the light-projecting element and the light-receiving element. The portion indicated by symbol 55 in FIG. 4B shows the amount of light in the case where there are two to three slits 75a between the light-projecting element and the light-receiving element. The portion indicated by symbol 56 in FIG. 4B shows the amount of light becomes the smallest in the case where there are two slits 75a between the light-projecting element and the light-receiving element. By using one pitch of the slits as an increment or decrement of the amount of light, the displacement of the amount of light as shown in FIG. 4B can be realized.

To measure the rotational range or length range to be measured with a desired resolution or a desired number of pulses, the encoder device requires as many slits as the resolution or the number of pulses to be arranged. Because of this, to measure with a higher resolution, the number of slits contained in the measurement range must be made larger. The larger the number of slits, the narrower the width of a single slit. As a result, the amount of light passing through the slits decreases.

To overcome this problem, an optical sensor has been installed close to the scale in the range that assures mechanical safety, so as to increase the amount of light entering the light-receiving element by making the distance between the scale and the optical sensor as small as possible and thereby decreasing a loss in the amount of light passing through the slits.

In the case of an encoder device without a fixed scale, however, although the optical signal whose amount of light increases and decreases depending on the relationship between the light-receiving area of the optical sensor and the slit width of the scale, is obtained, the distance between the optical sensor and the scale has not been examined in detail.

SUMMARY OF THE INVENTION

A first object of the present invention is to provide an optical rotary encoder device capable of sensing the reference position information reliably without making the insert section radially larger and an apparatus using the encoder device.

Another object of the present invention is to provide a highly reliable optical rotary encoder device which sets the distance between the optical sensor and the scale at a desired value and an apparatus using the encoder device.

The first object is accomplished by providing an optical rotary encoder device comprising:

a disk which has first and second sections differing in optical modulation rate formed alternately on its entire periphery, the first sections being made up of high optical modulation rate sections and low optical modulation rate sections; a light projection/reception section which is positioned so as to face the disk and projects and receives light onto and from the first and second sections on the disk; and rotating mechanism which rotates the disk and the light projection/reception section relatively.

The first object is also accomplished by providing a mechanical scanning ultrasonic probe comprising: an optical rotary encoder device comprising a disk which has first and second sections differing in optical modulation rate formed alternately on its entire periphery, the first sections being made up of high optical modulation rate sections and low optical modulation rate sections, a light projection/reception section which is positioned so as to face the disk and projects and receives light onto and from the first and second sections on the disk; and rotating mechanism which rotates the disk and the light projection/ reception section relatively; a rod member which houses the optical rotary encoder device at one lengthwise end; and an ultrasonic transducer section which is housed in the lengthwise end of the rod member and rotated by the rotating mechanism relatively with respect to the disk and the light projection/reception section.

The first object is still accomplished by providing an ultrasonographic apparatus comprising: a mechanical scanning ultrasonic probe comprising: an optical rotary encoder device comprising a disk which has first and second sections differing in optical modulation rate formed alternately on its entire periphery, the first sections being made up of high optical modulation rate sections and low optical modulation rate sections, a light projection/reception section which is positioned so as to face the disk and projects and receives light onto and from the first and second sections on the disk; and rotating mechanism which rotates the disk and the light projection/reception section relatively; a rod member which houses the optical rotary encoder device at one lengthwise end; and an ultrasonic transducer section which is housed in the lengthwise end of the rod member and rotated by the rotating mechanism relatively with respect to the disk and the light projection/reception section; and an ultrasonographic apparatus body comprising: a transmission/ reception section which drives the ultrasonic transducer section of the mechanical scanning ultrasonic probe; a signal processing section which processes the ultrasonic reception signal from the transmission/reception section; a display section which displays the output of the signal processing section; and means which controls the rotating mechanism and the light projection/reception section and which supplies the rotational angle data from the light projection/reception section to the transmission/reception section and the signal processing section.

With the present invention thus constructed, because the first sections made up of the high optical modulation rate sections and low optical modulation rate sections and the second sections produce a rotational angle signal and a reference position signal on the single signal generating face, there is no need of forming a signal generating face for reference position information and a signal generating face for rotational angle information separately to obtain a rotational angle signal and a reference position signal as found in a conventional equivalent. As a result, the tip of the insert portion of the ultrasonic probe can be made smaller in diameter.

Furthermore, with the present invention, since a second frequency signal component attributable to the first sections made up of the high optical modulation rate sections and low optical modulation rate sections is generated in addition to a first frequency component attributable to the alternate arrangement of the first and second sections, it is possible to generate rotation information on ultrasonic projection from the first frequency signal component and a reference position signal indicating the number of revolutions of the ultrasonic vibrator from the second frequency signal component. This enables the obtained signals to be separated by frequency, not by signal intensity. When the mechanical scanning ultrasonic probe is inserted in the body and the optical fiber constituting the rod member is bent, the reference position signal etc. can be obtained reliably without being affected by fluctuations in the light intensity.

The other object of the invention is accomplished by providing an optical rotary encoder device comprising: a disk which has first and second sections differing in reflectivity formed alternately on its entire periphery, the first sections being made up of high reflectivity sections and low reflectivity sections; a light projection/reception section which is positioned so as to face the disk and projects and receives light onto and from the first and second sections on the disk; and rotating mechanism which rotates the disk and the light projection/reception section relatively, with the distance L from the light-projecting face to the first and second sections on the disk being set to L≠L1 and L≠L2, where the distances for which the amount of optical signal received by the light projection/reception section is nearly constant with respect to a change in the moving position S are assumed to be L1 and L2 (L1<L2), if the moving position of the light-projecting face in the direction in which the first and second sections are arranged on the disk is S.

The other object of the invention is still accomplished by providing a mechanical scanning ultrasonic probe comprising: an optical rotary encoder device comprising a disk which has first and second sections differing in reflectivity formed alternately on its entire periphery, the first sections being made up of high reflectivity sections and low reflectivity sections; a light projection/reception section which is positioned so as to face the disk and projects and receives light onto and from the first and second sections on the disk; and rotating mechanism which rotates the disk and the light projection/reception section relatively, with the distance L from the light-projecting face to the first and second sections on the disk being set to L≠L1 and L≠L2; a rod member which houses the optical rotary encoder device at one lengthwise end; and an ultrasonic transducer section which is housed in the lengthwise end of the rod member and rotated by the rotating mechanism relatively with respect to the disk and the light projection/reception section, where the distances for which the amount of optical signal received by the light projection/reception section is nearly constant with respect to a change in the moving position S are assumed to be L1 and L2 (L1<L2), if the moving position of the light-projecting face in the direction in which the first and second sections are arranged on the disk is S.

The inventor of the present invention has found that there are two distances L1 and L2 (L1<L2) for which the amount of light received by the light-receiving face is nearly constant, even if the distance L from the light-projecting face to the first and second sections on the disk is changed. The invention is based on the finding.

Once the distance L has been set at distance L1 or distance L2, the amount of received light will not change even if the light-projecting face is moved to the first and second sections on the disk, with the result that the movement of the disk on which the first and second sections are formed cannot be measured.

Therefore, the inventor stopped thinking that because the shorter the distance L from the light-projecting face to the first and second sections on the disk, the larger the amount of received light, the shorter distance L is more advantageous in sensing the movement. Instead, the inventor has set the distance L from the light-projecting face to the first and second sections on the disk so that a change in the moving position S may be reflected in a change in the amount of received light.

Although the distances L1 and L2 are the quantities dependent on the numerical aperture NA etc., they cannot be expressed by physical quantities, such as numerical aperture NA. From a physical point of view, it is apparent that the quantity L2 is smaller than the quantity expressed by the expression $d/\tan(\sin^{-1}NA)$. By setting distance L larger than $d/\tan(\sin^{-1}NA)$, the following effects are achieved.

When optical fiber is used for the light projection/reception section, optical fiber has the property that when it is bent, the numerical aperture increases. If the numerical aperture increases as compared with the numerical aperture NA of straight optical fiber, the amount corresponding to $d/\tan(\sin^{-1}NA)$ will decrease the optical fiber bent. Therefore, by setting the distance L larger than $d/\tan(\sin^{-1}NA)$ for the numerical aperture NA of straight optical fiber), the distance L can be prevented from being set at distance L2, even if the numerical aperture changes due to the bend of the optical fiber. As a result, even when the optical fiber is bent in use, the effect on the sense signal can be made smaller.

When optical fiber is used in an ultrasonic probe provided with an optical rotary encoder device according to the invention, the optical fiber is often used in a curved state. By setting the distance L larger than $d/\tan(\sin^{-1}NA)$, the effect on the sense signal becomes smaller even if the numerical aperture increases due to the bend of the optical fiber. This makes it possible to provide an ultrasonic probe which produces highly reliable rotation information.

Furthermore, because the rotating scale section is made up only of the first and second sections on the disk and therefore has a simple structure, instead of using a fixed scale, this is advantageous in miniaturizing the encoder device. As a result, for example, it is possible to provide an optical rotary encoder device which is easy to apply to a long, thin ultrasonic probe with an outer diameter of 2 to 3 mm and a total length of about 2 m.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a plan view of a disk for the optical rotary encoder device of the embodiment;

FIG. 10 is an output waveform diagram of sense signal Po, rotational angle sense signal Sa, reference position sense signal Sb, signal Da pulsed from rotational angle sense signal Sa, and reference position signal Db obtained by processing reference position sense signal Sb, to help explain the operation in the present invention;

FIG. 11 is a plan view of a disk for an optical rotary encoder device according to another embodiment of the present invention;

FIG. 12 is a sectional view taken along line XII—XII of FIG. 11;

FIG. 13 is a perspective view of an optical rotary encoder device according to another embodiment of the present invention;

FIGS. 14A and 14B are a sectional view and enlarged plan view showing the positional relationship between the light-projecting/light-receiving section and optical slits in an optical rotary encoder device according to the present invention;

FIG. 15 shows various moving positions S of the illumination face on the reflecting sections and the non-reflecting sections to help explain the principle of sensing the amount of movement of the scale section that moves in an optical rotary encoder device according to the present invention;

DETAILED DESCRIPTION OF THE PREFERRED EMBODIMENTS

Figure 1:
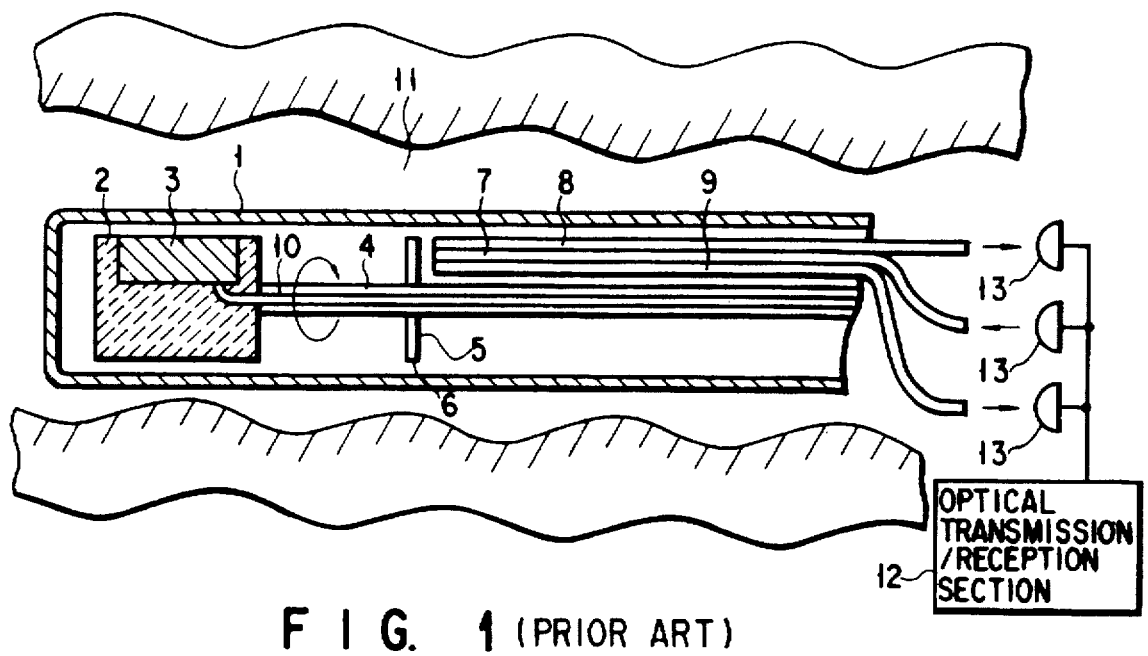
FIG. 1 is a sectional view of the tip portion of an ultrasonic probe into which a conventional optical rotary encoder device is incorporated.
Figure 2:
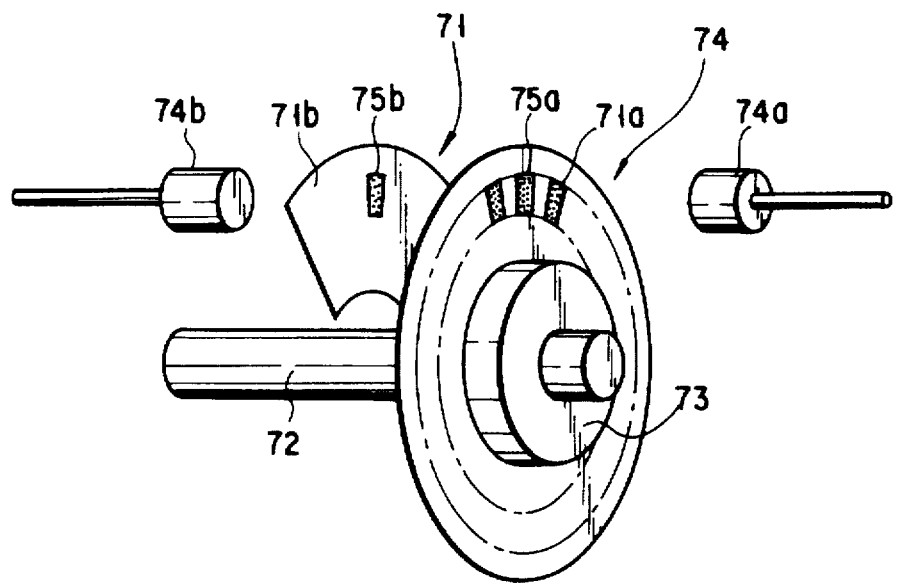
FIG. 2 is a perspective view of a conventional optical rotary encoder device.
Figure 3A:
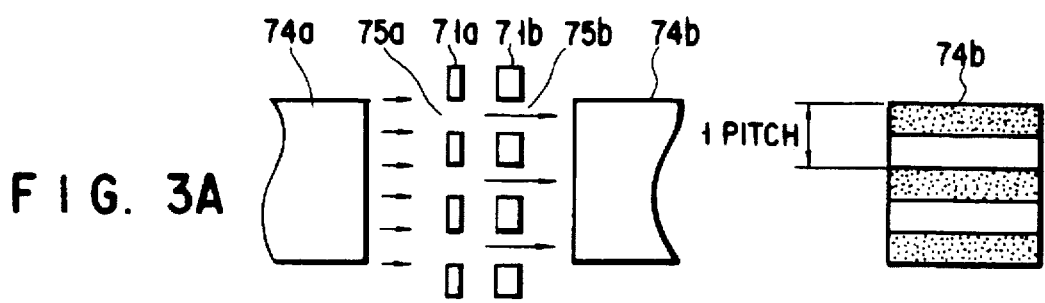
FIGS. 3A to 3C show the principle upon which a conventional rotary encoder device senses light.
Figure 3B:
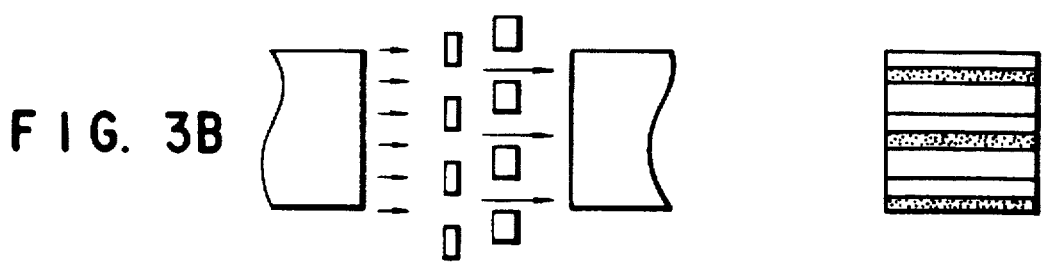
Figure 3C:
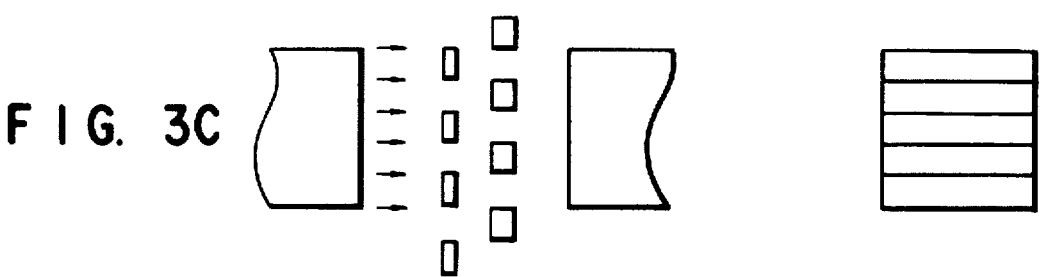
Figure 4A:
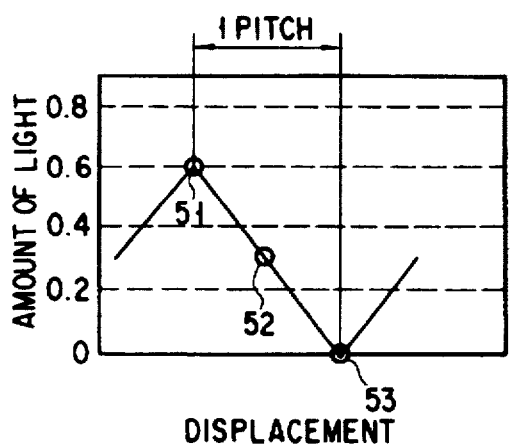
FIGS. 4A and 4B show the principle upon which a conventional rotary encoder device senses light.
Figure 4B:
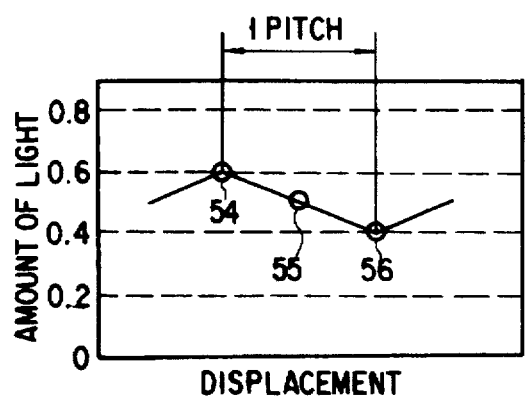
Figure 5:
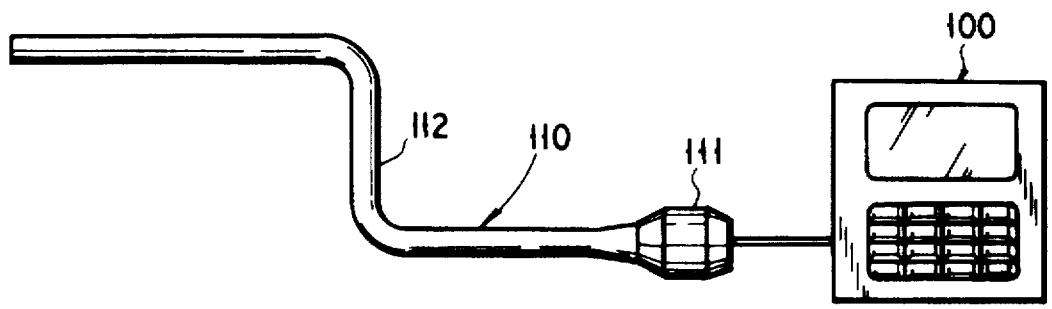
FIG. 5 is a schematic diagram of an ultrasonographic apparatus.

Hereinafter, an embodiment of an ultrasonographic apparatus to which an optical rotary encoder device according to the present invention is applied will be explained. As shown in FIG. 5, the ultrasonographic apparatus of the present embodiment comprises an ultrasonographic apparatus body 100 and a mechanical scanning ultrasonic probe 110.

Figure 6:
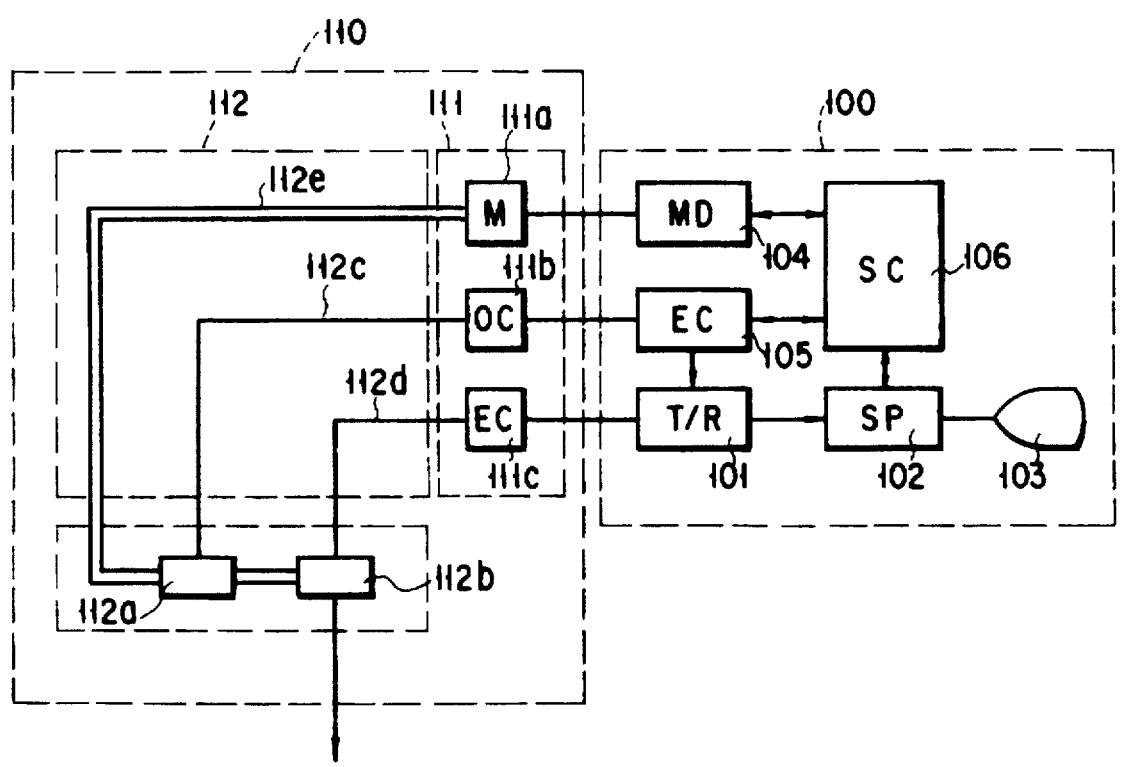
FIG. 6 is a schematic block diagram of an ultrasonographic apparatus.

As shown in FIG. 6, the ultrasonographic apparatus body 100 contains an ultrasonic transmission/reception section (T/R) 101, a signal processing section (SP) 102, a display section 103, a motor driving section (MD) 104, a rotational angle data computing section (EC) 105, and a system control section (SC) 106.

The mechanical scanning ultrasonic probe 110 is composed of a handgrip section 111 and a flexible rod 112, which is a rod member connected to the handgrip section 111. The body 112a of the optical rotary encoder device and an ultrasonic transducer 112b are built in the tip portion of the flexible rod 112. An optical fiber 112c of the encoder device body 112a and a signal line 112d of an ultrasonic vibrator 112b pass through the flexible rod 112 and reach the handgrip section 111. A flexible rotating shaft 112e is inserted into the flexible rod 112. A motor (M) 111a, an photocoupler (OC) 111b, and an electric coupler (EC) 111c such as a rotary transformer are built in the handgrip section 111. One end of the rotating shaft 112e is connected to the motor 111a in the handgrip 111 and the other end of the rotating shaft is connected to the ultrasonic vibrator 112a. The motor driving section 104 drives the motor 111a, thereby rotating the ultrasonic vibrator 112a via the flexible rod 112e. The optical fiber 112c of the encoder device body 112a is connected to the photocoupler 111b. The signal line 112d of the ultrasonic vibrator 112a is connected to the electric coupler 111c. These photocoupler 111b and electric coupler 111c optically and electrically connect the encoder device body 112a and ultrasonic vibrator 112b to the rotational angle data computing section 105 and ultrasonic transmission/reception section 101, respectively.

The encoder device body 112a of the present embodiment has a disk. On the disk, first and second sections are formed alternately on its entire periphery. The first and second sections differ in optical modulation rate at which the light intensity is changed by a light reflection phenomenon. The first sections are made up of high optical modulation rate sections and low optical modulation rate sections. Here, the optical modulation rate is the change rate of light intensity by a light reflection phenomenon.

The body 112a contains a light projection/reception section, which is placed so as to face the disk and projects and receives light onto and from the first and second sections. Specifically, the light projection/reception is an optical fiber. The disk and light projection/reception are rotated relatively by a rotating mechanism. Specifically, the disk is fixed and the light projection/reception section is rotated by the rotating shaft driven by the motor. The light from the light-projecting face of the light projection/ reception section is projected onto the first and second sections on the disk and the reflected light is received by the light-receiving face of the light transmission/reception section. Here, the optical modulation is to change the light intensity by at least one of a light reflection phenomenon, a light transmission phenomenon, and a light absorption phenomenon. The first sections consist of the high optical modulation rate sections in a specified angular portion in a 360-degree range and the low optical modulation rate sections in the remaining angular portion in the 360-degree range.

The rotational angle data computing section 105 processes the optical output from the light projection/reception section, thereby producing the rotational angle data and reference position data.

Figure 7:
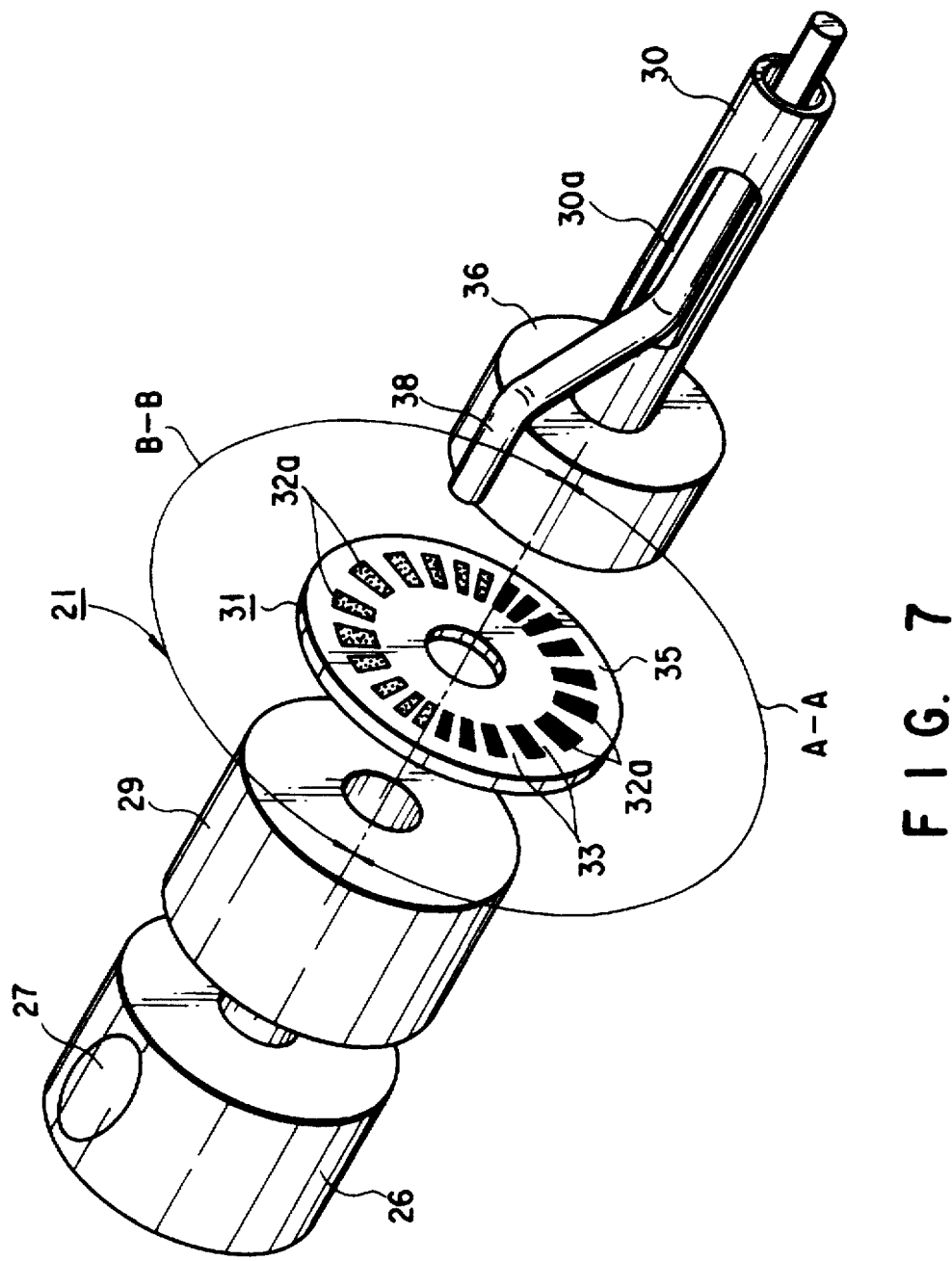
FIG. 7 is a perspective view of the tip portion of an ultrasonic probe provided with an optical rotary encoder device according to a preferred embodiment of the present invention.
Figure 8:
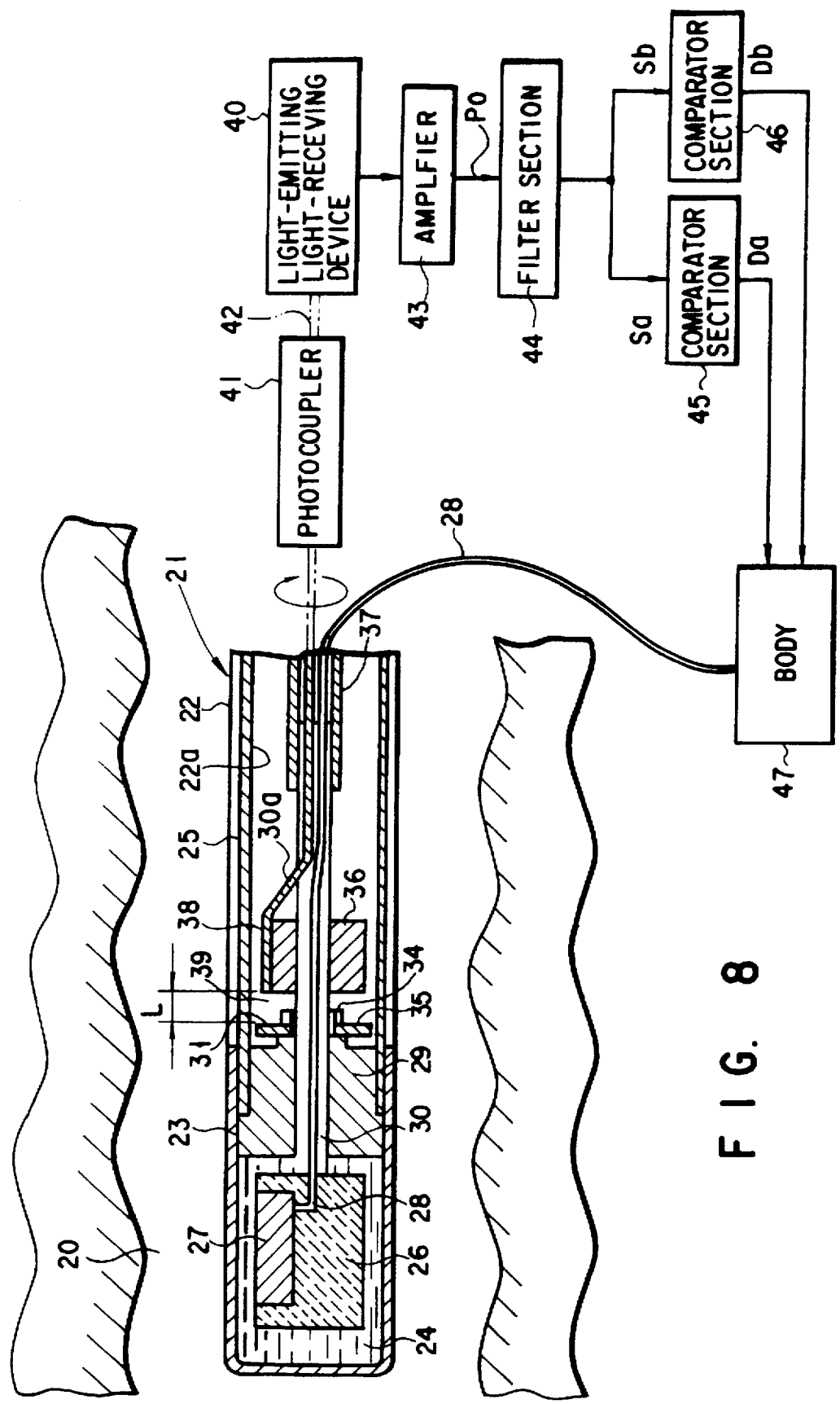
FIG. 8 shows the state where the optical rotary encoder device of the embodiment is inserted in the body cavity and the related circuitry.

Referring to FIGS. 7 to 9, an optical rotary encoder device according to the present invention, a mechanical scanning ultrasonic probe in which the encoder device is built, and an ultrasonographic apparatus will be explained.

In FIG. 8, an ultrasonic probe is inserted in the body cavity 20 of a person. A cap 23 is stuck to the tip of a flexible tube 22 constituting the tip portion 21. The cap 23 is formed of a material that has the property of allowing ultrasonic waves to pass through. Inside the cap 23, a chamber 24 for housing the ultrasonic vibrator 27 is provided. The chamber 24 is filled with ultrasonic-wave transmitting medium (e.g., physiological saline). Furthermore, in the chamber 24, an ultrasonic scanning member 26 is provided.

The ultrasonic vibrator 27 is stuck to the sidewall of the ultrasonic scanning member 26. The ultrasonic vibrator 27 is composed of an oscillation section that can generate ultrasonic waves of as high frequency as several tens MHz and a reception section that can receive the reflected waves inside the body cavity. An electric cable 28 is connected to the ultrasonic vibrator 27 and transmits the driving signal that drives the ultrasonic vibrator 27 and the reception signal by the reflected waves. Bearings 29 are connected to a cylindrical liner tube 25 installed on the inner wall of the tube 22. The bearings 29 support a rotating shaft 30 located on the axis of the tube 22 so that the shaft can rotate freely. One end of the rotating shaft 30 is bonded to the ultrasonic scanning member 26. The other end of the rotating shaft 30 is connected to one end of an optical fiber scanning member 36. The other end of the optical fiber scanning member 36 is attached to the inner end of a flexible shaft 37 made of a flexible material. The other end of the flexible shaft 37 is extended to the mouth of the ultrasonic probe and connected to a motor rotating shaft (not shown).

The optical fiber scanning member 36 is tubular.

A cutout (not shown) is made in part of the sidewall of the scanning member. An optical fiber 38 if fitted into the cutout and stuck therein. A disk 31 composing the encoder device is positioned so as to be concentric with the tube 22. The disk 31 is attached to the end of the bearings 29 facing the end of the optical fiber scanning member 36 in such a manner that the disk is pinched in a socket 34. Therefore, the disk 30 is not connected to the rotating shaft 30 and remains still.

As shown in FIGS. 7 and 9, the disk 31 has a signal generating face 35 on which first reflecting sections (regions) generally referred to as 32 and second reflecting sections regions 33 are formed alternately. The second reflecting sections 33 make use of the material characteristic of the disk 31 made of glass so that the amount of reflected light from the second reflecting sections 33 may be smaller than the amount of reflected light from the first reflecting sections 32.

The first reflecting sections 32 contain small reflection amount sections 32a and large reflection amount sections 32b, which are formed of materials whose reflectivity is different.

The first reflecting sections 32 on the disk 31 are formed by evaporating a specific material on a plate material such as glass. The small reflection amount sections 32a are formed by evaporating a material such as chromium. The large reflection amount sections 32a are formed by evaporating a material, such as gold or silver, whose reflectivity is higher than that of the material used for the small reflection amount sections.

In FIG. 9, the small reflection amount sections 32a are formed in an angular range of 180 degrees indicated by A—A on one side of the broken line passing through the center, and the large reflection amount sections 32b are formed in an angular range of 180 degrees indicated by B—B.

Near the axis of the tube 22, the optical fiber 38 is laid along the axis. One end of the optical fiber 38 is connected to a photocoupler 41 at the mouth of the ultrasonic probe. The optical fiber 38 passes through the flexible shaft 37 and rotating shaft 30 and through a hole 30a made in the outer periphery of the rotating shaft 30 and reaches the end of the optical fiber scanning member 36. Specifically, the optical fiber 38 passes near the axis of the tube 22, has its tip portion directed radially, and is positioned with a space 39 so that its end may face the signal generating face 35.

The optical fiber 38 is composed of a single optical fiber and serves as both a light-projecting fiber and a light-receiving fiber. A light-projecting fiber and a light-receiving fiber may be provided separately.

An optical fiber 42 is connected to a light-emitting /light-receiving device via the photocoupler 41. The photocoupler 41 optically connects the optical fiber 38 supported in a rotatable manner to the optical fiber 42 supported in a fixed manner.

The light-emitting/light-receiving device 40 is composed of a light illumination section, a light separation section, and a light-receiving section. The light-receiving section in the light-emitting/light-receiving device 40 is connected to an amplifier 43. The optical signal sense at the light-emitting/ light-receiving device 40 is converted photoelectrically at the light-receiving section in the light-emitting lightreceiving device 40 and amplified at the amplifier 43.

The amplified electric signal Po takes the waveforms as shown in FIG. 10. The electric signal Po is directed to a filter section 44, which separates the signal into two electric signals Sa and Sb according to frequencies. The electric signal Sa is processed at a comparator section 45, which outputs a pulse signal Da indicating rotational angle information. The electric signal Sb is processed at a comparator section 46, which outputs a pulse signal Db indicating reference position information. These pieces of rotation information and the ultrasonic echo signal transmitted via an electric cable 28 are introduced into the body 47, which processes these signals and produces an image of the inside of the body cavity 20.

As for the dimensions of the ultrasonic probe, the outer diameter of the tube 22 is 2 to 3 mm and the total length is about 2 m.

Hereinafter, the operation of the embodiment will be explained.

As the flexible shaft 37 is rotated by the motor, the optical fiber scanning member 36, rotating shaft 30, ultrasonic scanning member 26, and ultrasonic vibrator 27 rotate. Since the disk 31 is secured to the bearings 29, the light beam emitted from the end of the optical fiber 38 is projected onto the signal generating face 35, while rotating on the axis of the tube.

Since the first reflecting sections 32a, 32b and the second reflecting sections 33 are formed on the signal generating face 35, a sense signal is obtained according to the rotational angle of the disk 31. The sense signal is produced by combining the signal that increases and decreases by the small reflection amount sections 32a and the second reflecting sections 33 and the signal that increases and decreases by the large reflection amount sections.

The sense signal Po is formed by superimposing the rotational angle sense signal Sa originating in the alternate arrangement of the first reflecting sections 32 and the second reflecting sections 33 upon the reference position sense signal Sb originating in the fact that the first reflecting sections 32 are formed of materials with a different reflectivities and the reflectivity distribution varies in a sinusoidal manner in the angular range of A—A and the angular range of B—B.

The sense signal Po is separated by the filter section 44 into a rotational angle sense signal Sa and a reference position sense signal Sb. Then, the comparator sections 45, 46 output a pulse signal Da indicating rotational angle information and a pulse signal Db indicating reference position information. In this way, the rotational angle of the disk 31 and the rotation information on the reference position are obtained, making it possible to grasp the rotating state of the ultrasonic vibrator 27 accurately.

With the configuration of the present embodiment, because the reference position information can be created on the same periphery on which the area where the rotational angle information is formed is present, it is not necessary to make the diameter of the signal generating face larger, with the result that the tip of the insert section can be made smaller in diameter.

Since a method of separating the signal from the encoder by frequency is used, the signal is almost unaffected by fluctuations in the light intensity even if the ultrasonic probe is inserted in the body and the optical fiber bends. Therefore, the present method can sense a signal more reliably than a conventional method that produces a reference position signal by signal intensity.

The disk 31 having the signal generating face 35 is not limited to the example shown in FIG. 9. For example, in FIG. 9, the reflectivity may be distributed between the small reflection amount sections 32a formed in the angular range A—A and between the large reflection amount sections 32b formed in the angular range B—B, and the small reflection amount section 32a in a position facing the broken line passing through the center may be formed so as to have the lowest reflectivity, with the reflectivity becoming higher in a sinusoidal manner as the distance from the small reflection amount section 32aa becomes larger on both sides. Similarly, the large reflection amount section 32bb in a position facing the broken line passing through the center of the shaft may be formed so as to have the highest reflectivity, with the reflectivity becoming lower in a sinusoidal manner as the distance from the large reflection amount section 32bb becomes larger on both sides. Furthermore, the small reflection amount section 32a and the reflecting section 32b which are close to each other and sandwich the broken line passing through the center between them, may be formed so as to have almost the same reflectivity. In this case, the waveform of the reference position sense signal Sb shown in FIG. 10 becomes more rectangular.

A disk 61 shaped as shown in FIGS. 11 and 12 may be used. In the disk 61, a first surface 61a and a second surface 61b are formed so as to have a step 62 between them. On these surfaces, first reflecting sections 63a and second reflecting sections 63b are formed so as to be arranged alternately, thereby forming a signal generating face. When the disk 61 is attached to the bearings 29, the amount of reflected light from the first surface 61a on the signal generating surface 65 is larger than that from the second surface 61b, because the first surface 61a is formed so as to be closer to the end of the optical fiber 38 than the second surface. Therefore, even if the disk 61 is shaped so as to have a step and a signal generating face is formed on its surface, the amount of reflected light can be changed as in the previous embodiment.

In the disk 61 of the present embodiment, the signal generating face side of the disk is worked so as to have a step and thereafter the first reflecting sections are formed by photoetching. Since the first reflecting sections and second reflecting sections can be formed in a single process, this makes the manufacture easier.

When the present invention is applied to a transmission-type encoder device, a light-receiving optical fiber and a light-projecting optical fiber are placed so that their ends may face each other with the disk between them, thereby sensing a change in the amount of transmitted light from the transmittable disk such as glass. Namely, this is achieved by forming the second reflecting sections so that the amount of transmitted light in a specific angular range may differ from that in the other angular range. For example, the amount of transmitted light can be changed by changing the roughness of the glass surface corresponding to the second reflecting sections or applying or evaporating a transmittable material.

Instead of the amount of transmitted light, a change in the amount of absorbed light may be sensed.

Although the reference position signal Sb has one signal waveform when the signal generating face 65 rotates once, it has only to be distinguished from the rotational angle sense signal Sa because the former has a different frequency. For example, two or more signal waveforms may be generated when the signal generating face 65 rotates once. In this case, after the reference position sense signal Sb obtained by frequency separation has been processed, a specific number of pulses is counted, thereby producing information on the reference position.

While in the above embodiment, the angular range A—A and the angular range B—B are each set at 180 degrees, the present invention is not restricted to these settings. For instance, in a case where one revolution of the signal generating face 65 produces one signal waveform of reference position sense signal Sb, the sum of the angular range A—A and the angular range B—B has only to be 360 degrees. Therefore, for instance, the angular range A—A may be set at 240 degrees and the angular range B—B at 120 degrees. Furthermore, the angular range A—A may be set at 355 degrees, and the angular range B—B at 5 degrees.

While in the above embodiment, the optical fiber is rotated, the disk on which the reflecting sections are formed may be rotated. A relative rotation of the optical fiber and disk results in a similar operation.

As described above, with the present embodiment, the sense signal is separated by frequency, and the rotational angle information and the reference position signal in the encoder device are outputted independently, so that accurate rotation information can be obtained without making the diameter of the insert section larger.

Referring to FIG. 13, another embodiment of the encoder device according to the present invention will be explained. A rotating body 81 of the encoder device comprises a cylindrical rotating shaft 82 and a scale section 83, a disk, secured to the rotating shaft 82. On the scale section 83, reflecting sections 84a and non-reflecting sections 84b are arranged alternately at specific intervals near the outer periphery in such a manner that they are concentric with the axis of the rotating shaft 82. The reflecting sections 84a and non-reflecting sections 84b correspond to first and second sections and differ in optical modulation rate. Here, optical modulation is to change the light intensity by a light reflection phenomenon.

These reflecting sections 84a and non-reflecting sections 84b constitute optical slits 84. An optical sensor 85 is provided so as to face the surface of the optical slits 84. The optical sensor 85, although not shown concretely, is composed of a light-projecting/light-receiving section 85a and an optical fiber 85b and is connected to a signal control unit 86 in which a light source, a signal sensing section, etc. are housed.

The optical slits 84 and the light-projecting/light-receiving section 85a in the encoder device thus constructed are positioned as shown in FIGS. 14A and 14B. The illumination face that projects a light beam onto the scale section 83 and the light-receiving face that receives the optical signal reflected from the scale section 83 is the same face, which is indicated by the area 87. In the hatching portion in the area 87, light is reflected and received by the light-projecting/light-receiving section 85a, with the result that the wider the hatching portion, the larger the output of the sensed optical signal.

When the area 87 and the optical slits 84 are in the positional relationship as shown in FIG. 15(a), the output signal (the amount of reflected light) is the largest. When the scale section 83 rotates and the optical slits 84 move ½p (p is the pitch between slits and the sum of the length of reflecting section 84a and the length of non-reflecting section 14(b) with respect to FIG. 15(a), they are in the positional relationship as shown in FIG. 15(c), and the output signal is the smallest. When the optical slits 84 move ¼p with respect to FIG. 15(a), they are in the positional relationship as shown FIG. 15(b) and the output signal has half of the value obtained in FIGS. 15(a) and 15(c). Furthermore, when the optical slits move ¾p with respect to FIG. 15(a), they are in the positional relationship as shown in FIG. 15(d), the output signal has the same value as in FIG. 15(b).

In such an encoder device, when the distance L between the scale section 83 and the light-projecting/light-receiving section 85a of the optical sensor 85 is changed, the amount of the light reflected from the area 87 changes, causing the output signal to change greatly.

FIGS. 16 to 19 show the change of the amount of the light reflected from the scale section 83 at the time when the distance L between the scale section 83 and the light-projecting/light-receiving section 85a is changed on the configuration as shown in FIGS. 14A and 14B. Here, the horizontal axis indicates the distance L and the vertical axis indicates the ratio (P/Po) of the output value P of the amount of received light to the output value Po of projected light.

Figure 16:
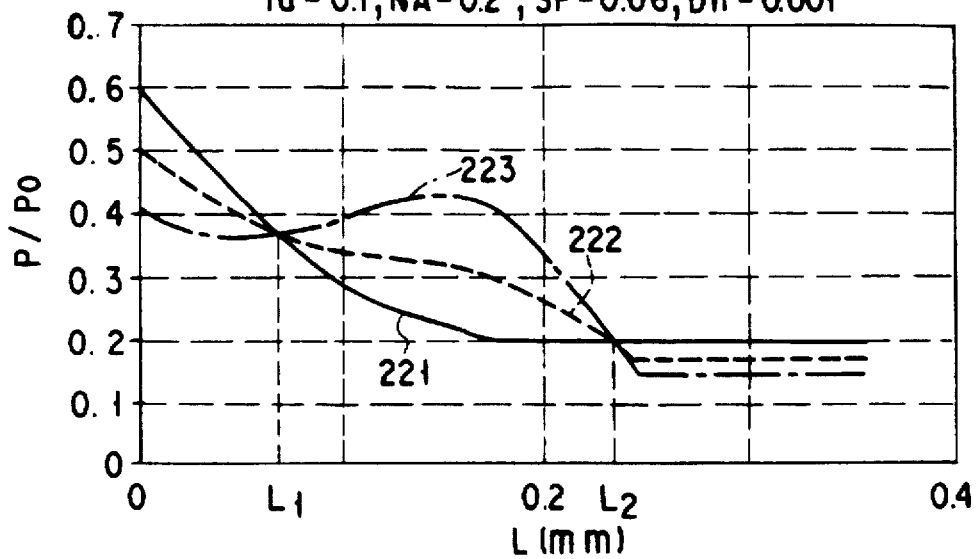
FIG. 16 shows the relationship between a distance of L with specific conditions, including a numerical aperture of NA, being set, and the amount of light received in an optical rotary encoder device.

FIG. 16 shows the results in the case where the diameter 2d (indicated by symbol fd in FIGS. 16 to 19) of the light-projecting/light-receiving section 15 is 0.1 mm, the numerical aperture NA is 0.2, and the value SP of pitch p of the optical slits is 0.06 mm. Curve 221 indicates P/Po in the case where the distance L is changed with the optical slits 84 in the position of FIG. 15(a); curve 222 indicates P/Po in the case where the distance L is changed with the optical slits 84 in the position of FIG. 15(b); and curve 223 indicates P/Po in the case where the distance L is changed with the optical slits 84 in the position of FIG. 15(c). By placing the light-projecting/light-receiving section 85a in the position with a distance of L where curve 221 differs greatly from curve 223 in the output value, a sinusoidal output signal can be obtained in synchronization with the rotational motion of the optical slits 84, whereby an encoder device is formed.

In contrast, when the light-projecting/light-receiving section 85a is placed in the position with a distance of L1 or L2 where curve 221 and curve 223 coincide with each other in the output value, the output value remains unchanged even if the optical slits 84 rotate, thus producing no sinusoidal output signal in synchronization with the rotational motion of the optical slits 84, with the result that the reflecting sections 84a and non-reflecting sections 84b of the optical slits 84 cannot be sensed and therefore the movement of the scale section 84 cannot be measured.

Figure 17:
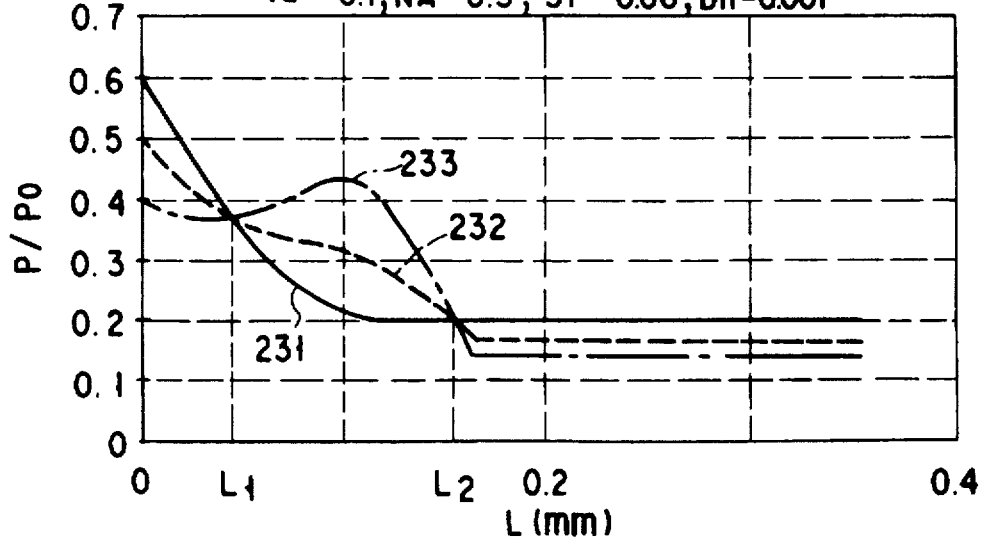
FIG. 17 shows the relationship between a distance of L with specific conditions, including a numerical aperture of NA, being set at other values, and the amount of light received in an optical rotary encoder device.

FIG. 17 shows the results in the case where the diameter 2d of the light-projecting/light-receiving section 85a is 0.1 mm, the numerical aperture NA is 0.3, and the value SP of pitch p of the optical slits 84 is 0.06 mm. Curve 231 indicates P/Po in the case where the distance L is changed with the optical slits 84 in the position of FIG. 15(a); curve 232 indicates P/Po in the case where the distance L is changed with the optical slits 84 in the position of FIG. 15(b); and curve 233 indicates P/Po in the case where the distance L is changed with the optical slits 84 in the position of FIG. 15(c).

Figure 18:
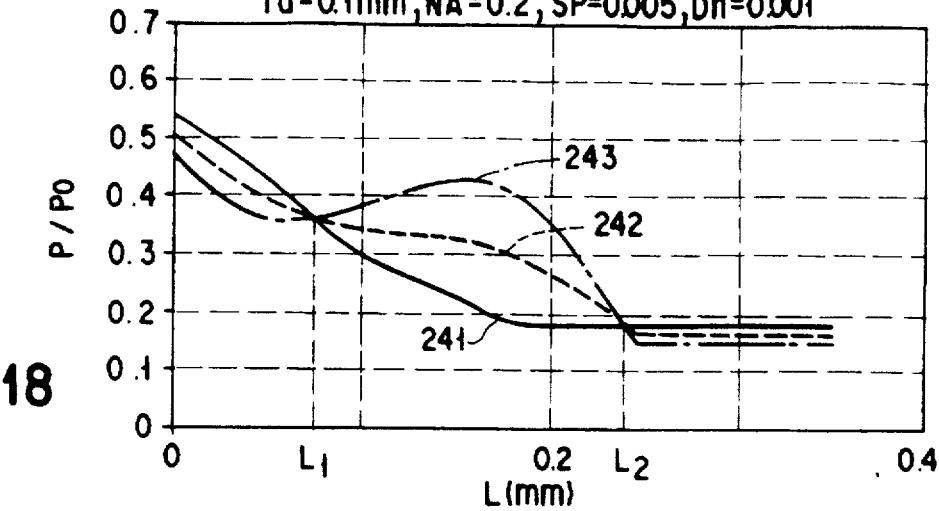
FIG. 18 shows the relationship between a distance of L with specific conditions, including a numerical aperture of NA, being set, and the amount of light received in an optical rotary encoder device.

FIG. 18 shows the results in the case where the diameter 2d of the light-projecting/light-receiving section 85a is 0.1 mm, the numerical aperture NA is 0.2, and the value SP of pitch p of the optical slits 84 is 0.05 mm. Curve 241 indicates P/Po in the case where the distance L is changed with the optical slits 84 in the position of FIG. 15(a); curve 242 indicates P/Po in the case where the distance L is changed with the optical slits 84 in the position of FIG. 15(b); and curve 243 indicates P/Po in the case where the distance L is changed with the optical slits 84 in the position of FIG. 15(c).

Figure 19:
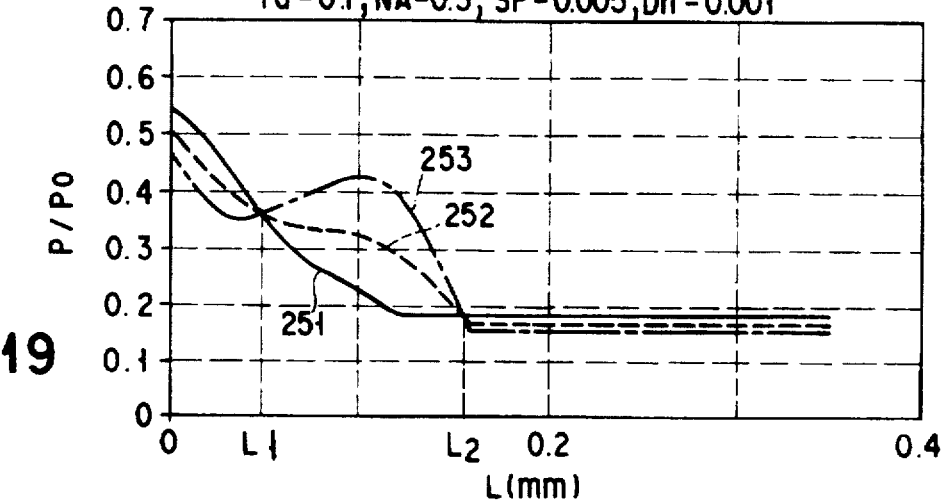
FIG. 19 shows the relationship between a distance of L with specific conditions, including a numerical aperture of NA, being set at other values, and the amount of light received in an optical rotary encoder device.

FIG. 19 shows the results in the case where the diameter 2d of the light-projecting/light-receiving section 85a is 0.1 mm, the numerical aperture NA is 0.3, and the value SP of pitch p of the optical slits 84 is 0.05 mm. Curve 251 indicates P/Po in the case where the distance L is changed with the optical slits 84 in the position of FIG. 15(a); curve 252 indicates P/Po in the case where the distance L is changed with the optical slits 84 in the position of FIG. 15(b); and curve 253 indicates P/Po in the case where the distance L is changed with the optical slits 84 in the position of FIG. 15(c).

Under the conditions shown in FIGS. 16 to 19, all cases produce similar effects. Namely, there are distances of L1 and L2 that prevent the reflecting sections 84a and non-reflecting sections 84b of the optical slits 84 from being sensed, with the result that the movement of the scale section 83 cannot be measured. This means that the optical slits 84 cannot be sensed, depending on the distance between the optical slits 84 and the light-projecting/light-receiving section 85a, and therefore there are places that cannot function as an encoder. To overcome this problem, in the e process of placing the lightprojecting/light-receiving section 85a in a place facing the optical slits 84, the distance L between the optical slits 84 and the light-projecting/light-receiving section 85a is determined by the core diameter and numerical aperture of the optical fiber and the slit width of the scale section 83. By placing the light-projecting/light-receiving section in that position, a highly-reliable encoder can be produced.

Hereinafter, an encoder will be explained which has the scale 83 and the light-projecting/light-receiving section 85a positioned so as to meet the following expression:

$$L > d / \tan(\sin^{-1} NA)$$

where L is the distance between the scale section 83 and the light-projecting/light-receiving section 85a, 2d is the core diameter of the lightprojecting/light-receiving section 85a, and NA is the numerical aperture of the light-projecting/ light-receiving section 85.

Once the light-projecting/light-receiving section 85a is placed in a position meeting the above expression, only the light projected almost perpendicularly to the optical slits 84 is received by the light-projecting/light-receiving section 85a. Namely, the optical slits 84 are sensed using only the parallel light projected from the light-projecting/light-receiving section 85a. Since it is considered that the amount of parallel light received is constant even if the distance L changes, $d/\tan(\sin^{-1}NA)$ corresponds to the case where a distance larger than L2 is set in FIGS. 16 to 19.

Optical fiber has the property that NA becomes larger when it is bent. When NA gets larger, the amount corresponding to $d/\tan(\sin^{-1}NA)$ gets smaller. Therefore, by setting the distance L for the numerical aperture NA of a straight optical fiber so as to meet $L>d/\tan(\sin^{-1}NA)$, the distance L will not be smaller than the distance L2 even when the optical fiber is bent in use. Therefore, it is possible to provide a highly reliable encoder less affected by the bend of optical fiber.

An ultrasonic probe of the same configuration as shown in FIG. 8 can be used in the present embodiment, after the distance L has been determined in FIG. 8.

Figure 20:
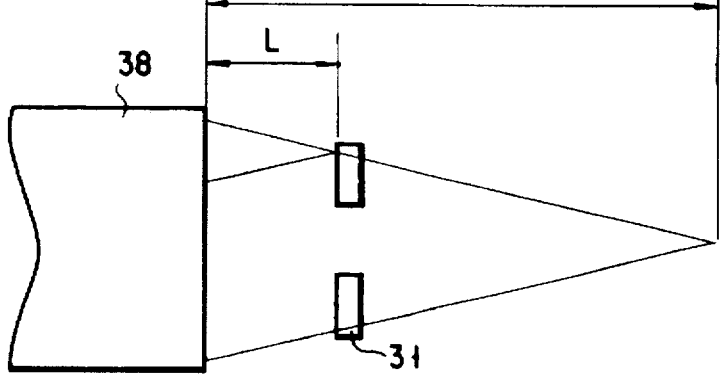
FIG. 20 shows a distance of L from the end of the optical fiber to the scale section in the present invention.

As shown in FIG. 20, in the present embodiment, the disk 31 (the scale section 83) and the light projection/reception face (the light-projecting/light-receiving section 85a) are positioned so as to meet the expression:

$$L>d/\tan(\sin^{-1}NA)$$

where the distance between the disk 31 (the scale section 83) and the light projection/reception face of the optical fiber 38 (the light-projecting/ light-receiving section 85a) in FIG. 8 is L, the core diameter of the light projection face (the lightprojecting/ light-receiving section 85a) is 2d, and the numerical number of the light projection/reception face of the optical fiber 38 (the light-projecting/light-receiving section 85a) is NA.

With the configuration of the present embodiment, in the process of placing the end of the optical fiber 38, the distance L between the signal generating face 35 (the optical slits) and the optical fiber 38 is determined suitably by the core diameter and numerical aperture of the optical fiber 38 and the pitch between the reflecting sections and the non-reflecting sections formed on the signal generating face 35 (the optical slits). Therefore, by placing them in the determined positions, it is possible to obtain highly reliable accurate rotation information.

An ultrasonic probe according to another embodiment will be explained which has the optical fiber 38 placed in a position facing the signal generating face 35 (the optical slit) so as to meet the expression:

$$L>d/\tan(\sin^{-1}NA)$$

where the distance from the optical fiber 38 is L, the core diameter of the optical fiber 38 is 2d, and the numerical number of the optical fiber 38 is NA.

When the optical fiber 38 is positioned so as to face the signal generating face 35 (the optical slits), only the light projected almost perpendicularly to the signal generating face 35 (the optical slits) is received by the optical fiber 38. That is, the signal generating face 35 (the optical slits) is sensed using only the parallel components of the light projected from the optical fiber 38. Optical fiber generally has the property that the NA becomes larger when it is bent.

As seen from the above expression, as NA becomes larger, the distance L becomes smaller. Therefore, even when the optical fiber is bent in use, this can be dealt with successfully by setting NA to that for straight optical fiber in advance. An ultrasonic probe is used in such a manner that it is inserted in the body cavity or in a pipe, so that the optical fiber laid inside the ultrasonic probe is always used in a curved state. Therefore, the encoder device of the present invention is most suitable for ultrasonic probes. As a result, it is possible to provide a highly reliable ultrasonic probe capable of always producing accurate rotation information.

With the present embodiment, it is easy to apply an encoder of the invention to a long, fine ultrasonic probe with an outer diameter of 2 to 3 mm and a total length of about 2 m and it is possible to always obtain accurate rotation information and improve the reliability of the ultrasonic probe.

While in the embodiment of the encoder device, the illumination face is the light-receiving face, the present invention is not limited to this. For instance, the light-receiving face may be in a symmetrical position to the scale section.

As described above, with the present embodiment, because the distance L from the illumination face to the scale section is set at a value other than distance L1 and distance L2, a change in the moving position S can be sensitively reflected in a change in the amount of received light, making it possible to construct a highly reliable encoder device. By constructing an ultrasonic probe using the encoder device, accurate rotation information can be obtained, thereby improving the reliability of the ultrasonic probe.

Although in the above embodiments, the optical fiber is rotated, the disk on which the reflecting sections are formed may be rotated. The relative rotation of the optical fiber and the disk results in a similar operation.

While in the above embodiment, the ultrasonic vibrator is rotated, the direction in which ultrasonic waves are emitted from the ultrasonic vibrator may be fixed and the emitted ultrasonic waves may be projected into the body cavity by a reflecting mirror set at an angle of 45 degrees. In this case, rotating the reflecting mirror realizes a similar operation.

Although in the above embodiments, the second reflecting sections with a smaller amount of reflected light than that of the first reflecting sections are provided, the second reflecting sections may be replaced with slit-like holes made in the disk. In this case, the projected light beam will pass through the disk. Furthermore, the second reflecting sections may be formed or processed into a high light absorption rate state.

While in the above embodiments, the ultrasonic diagnostic apparatus is inserted in the body cavity, the present invention may be applied to ordinary ultrasonographic apparatuses for industrial use, including use in piping.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical rotary encoder device comprising:
    a disk which has a signal generating face shaped as a single ring consisting essentially of first and second regions arranged for providing rotational angle signals formed along the peripheral direction of the disk, the first regions including first sections which have a predetermined optical modulation rate and second sections which have an optical modulation rate smaller than the optical modulation rate of the first sections, the first sections and the second sections of the first regions and the second regions arranged for providing reference position signals;

a light projection/reception section which is positioned so as to face said disk and projects and receives light onto and from said signal generating face on said disk; and a rotating mechanism which rotates said disk and said light projection/reception section relatively.

2. An optical rotary encoder device according to claim 1, wherein said optical modulation changes the light intensity by at least one of a light reflection phenomenon, a light transmission phenomenon, and a light absorption phenomenon.

3. An optical rotary encoder device according to claim 1, wherein at least one of said second regions, said high optical modulation rate sections, and said low optical modulation rate sections is formed by applying a material with a specified reflectivity onto said disk.

4. An optical rotary encoder device according to claim 1, wherein at least one of said second regions, said high optical modulation rate sections, and said low optical modulation rate sections is slits with a specific area formed on said disk.

5. An optical rotary encoder device according to claim 1, wherein at least one of said second regions, said high optical modulation rate sections, and said low optical modulation rate sections is a step portion provided in the direction of the axis of said disk.

6. An optical rotary encoder device according to claim 1, wherein at least one of said second regions, said high optical modulation rate sections, and said low optical modulation rate sections has a step portion formed in the direction of the axis of said disk, with a material with a specified reflectivity being applied to said step portion.

7. An optical rotary encoder device according to claim 1, wherein said disk has first and second regions differing in the amount of reflected light formed alternately on its entire periphery, said first regions being made up of high reflectivity sections and low reflectivity sections.

8. An optical rotary encoder device according to claim 1, wherein said disk has first regions reflecting light and second regions transmitting light formed alternately on its entire periphery, said first sections regions being made up of high reflectivity sections and low reflectivity sections.

9. An optical rotary encoder device according to claim 1, wherein said disk has first regions reflecting light and second regions absorbing light formed alternately on its entire periphery, said first sections regions being made up of high reflectivity sections and low reflectivity sections.

10. An optical rotary encoder device according to claim 1, wherein said first regions include said high optical modulation rate sections in a specific angular portion in a 360-degree range and said low optical modulation rate sections in the remaining angular portion in the 360-degree range.

11. An optical rotary encoder device according to claim 1, further comprising a data acquisition section which acquires rotational angle data and reference position data by processing the optical output signal from said light projection/reception section.

12. An optical rotary encoder device according to claim 1, wherein said light projection/reception section includes a light-projecting face, and the distance L from the light-projecting face of said light projection/reception section to the first and second regions on said disk is set to L≠L1 and L≠L2, where the distances for which the amount of optical signal received by said light projections/reception section is nearly constant with respect to a change in the moving position S are assumed to be L1 and L2 (L1<L2), when the moving position of said light-projecting face in the direction in which the first and second regions are arranged on said disk is S.

13. An optical rotary encoder device according to claim 12, wherein said distance L is set to L1<L<L2.

14. An optical rotary encoder device according to claim 12, wherein said distance L is set to L<L1.

15. An optical rotary encoder device according to claim 12, wherein said distance L is set to L2<L.

16. An optical rotary encoder device according to claim 12, wherein said distance 1, is set so as to meet L>d/tan (sin$^{-1}$NA), where the diameter of the light-projecting face of said light projections/reception section is 2d and the numerical aperture through which the first and second regions are viewed from the light-projecting face of said light projections/reception section is NA.

17. The optical rotary encoder device of claim 1 wherein said first sections and said second sections are formed in groups, and wherein an angular extent of said groups of first sections along the peripheral direction of the disk is the same as an angular extent of said groups of second sections along the peripheral direction of the disk.

18. The optical rotary encoder device of claim 1 wherein each of said second regions is positioned between two adjacent ones of said first and second sections.

19. A mechanical scanning ultrasonic probe comprising:

an optical rotary encoder device comprising a disk which a signal generating face shaped as a ring of first and second regions formed along the peripheral direction of the disk, the first regions including first sections which have a predetermined optical modulation rate and second sections which have an optical modulation rate smaller than the optical modulation rate of the first sections;

a light projection/reception section which is positioned so as to face said disk and projects and receives light onto and from said signal generating face on said disk and a rotating mechanism which rotates said disk and said light projection/reception section relatively;

a rod member which houses the optical rotary encoder device at one lengthwise end; and an ultrasonic transducer section which is housed in the lengthwise end of said rod member and rotated by said rotating mechanism relatively with respect to said disk and said light projection/reception section.

20. A mechanical scanning ultrasonic probe according to claim 19, wherein said rod member is a flexible tube inserted in a subject.

21. A mechanical scanning ultrasonic probe according to claim 19, wherein said light projection/reception is an optical fiber member provided in said rod member.

22. The probe of claim 19 wherein said second regions have an optical modulation rate different from the optical modulation rates of said first sections and second sections of said first regions.

23. The probe of claim 22 wherein said first sections and said second sections are formed in groups, and wherein an angular extent of said groups of first sections along the peripheral direction of the disk is the same as an angular extent of said groups of second sections along the peripheral direction of the disk.

24. The probe of claim 23 wherein each of said second regions is positioned between two adjacent ones of said first and second sections.

25. The probe of claim 22 wherein each of said second regions is positioned between two adjacent ones of said first and second sections.

26. The probe of claim 19 wherein said first sections and said second sections are formed in groups, and wherein an angular extent of said groups of first sections along the peripheral direction of the disk is the same as an angular extent of said groups of second sections along the peripheral direction of the disk.

27. The probe of claim 19 wherein each of said second regions is positioned between two adjacent ones of said first and second sections.

28. An ultrasonographic apparatus comprising:
a mechanical scanning ultrasonic probe comprising an optical rotary encoder device comprising which has a signal generating face shaped as a ring of first and second regions formed along the peripheral direction of the disk, the first regions including first sections which have a predetermined optical modulation rate and second sections which have an optical modulation rate smaller than the optical modulation rate of the first sections; a light projection/reception section which is positioned so as to face said disk and projects and receives light onto and from said signal generating face on said disk; a rotating mechanism which rotates said disk and said light projection/reception section relatively; a rod member which houses the optical rotary encoder device at one lengthwise end; and an ultrasonic transducer section which is housed in the lengthwise end of said rod member and rotated by said rotating mechanism relatively with respect to said disk and said light projection/reception section; and an ultrasonic apparatus body comprising a transmission/reception section which drives said ultrasonic tranducer section of the mechanical scanning ultrasonic probe; a signal processing section which processes the ultrasonic reception signal from the transmission/reception section; a display section which displays the output of the signal processing section; and means which controls said rotating mechanism and said light projection/reception section and which supplies the rotational angle data from said light projection/reception section to said transmission/reception section and said signal processing section.

29. The apparatus of claim 28 wherein said second regions have an optical modulation rate different from the optical modulation rates of said first sections and said second sections of said first regions.

30. The apparatus of claim 28 wherein said first sections and said second sections are formed in groups, and wherein an angular extent of said groups of first sections along the peripheral direction of the disk is the same as an angular extent of said groups of second sections along the peripheral direction of the disk.

31. The apparatus of claim 30 wherein said first sections and said second sections are formed in groups, and wherein an angular extent of said groups of first sections along the peripheral direction of the disk is the same as an angular extent of said groups of second sections along the peripheral direction of the disk.

32. The apparatus of claim 30 wherein each of said second regions is positioned between two adjacent ones of said first and second sections.

33. The apparatus of claim 28 wherein each of said second regions is positioned between two adjacent ones of said first and second sections.

34. The apparatus of claim 33 wherein each of said second regions is positioned between two adjacent ones of said first and second sections.

35. An optical rotary encoder device comprising:
a disk which has a signal generating face shaped as a single ring consisting essentially of first and second regions formed along the peripheral direction of the disk, the first regions including first sections which have a predetermined optical modulation rate and second sections which have an optical modulation rate smaller than the optical modulation rate of the first sections; a light projection/reception section including a light-projecting face which is positioned so as to face said disk and projects and receives light onto and from said signal generating face on said disk; and a rotating mechanism which rotates said light projection/reception section relatively, with the distance L from said light-projecting face to the first and second regions on said disk being set to $L \neq L1$ and $L \neq L2$, where the distances for which the amount of optical signal received by said light projection/reception section is nearly constant with respect to a change in the moving position S assumed to be L1 and L2 (L1<L2), when the moving position of said light-projecting face in the direction in which the first and second sections are arranged on said disk is S.

36. An optical rotary encoder device according to claim 35, wherein said distance L is set to L1<L<L2.

37. An optical rotary encoder device according to claim 35, wherein said distance L is set to L<L1.

38. An optical rotary encoder device according to claim 35, wherein said distance L is set to L2<L.

39. An optical rotary encoder device according to claim 35, wherein said distance L is set so as to meet $L > d/\tan(\sin^{-1}NA)$, where the diameter of the light-projecting face of said light projection/reception section is 2d and the numerical aperture through which the first and second sections are viewed from the light-projecting face of said light projection/reception section is NA.

40. A mechanical scanning ultrasonic probe comprising:
an optical rotary encoder device comprising a disk which has a signal generating face shaped as a ring in reflectivity formed along the peripheral direction of the disk, the first regions including first sections which have a predetermined optical modulation rate and second sections which have an optical modulation rate smaller than the optical modulation rate of the first sections; a light projection/reception section including a light-projecting face which is positioned so as to face said disk and projects and receives light onto and from said signal generating face on said disk; and a rotating mechanism which rotates said disk and said light projection/reception section relatively, with the distance L from said light-projecting face to the first and second regions on said disk being set to $L \neq L1$ and $L \neq L2$;

a rod member which houses the optical rotary encoder device at one lengthwise end; and an ultrasonic transducer section which is housed in the lengthwise end of said rod member and rotated by said rotating mechanism relatively with respect to said disk and said light projection/reception section, where the distances for which the amount of optical signal received by said light projection/reception section is nearly constant with respect to a change in the moving position S are assumed to be L1 and L2 (L1<L2), if when the moving position of said light-projecting face in the direction in which the first and second sections are arranged on said disk is S.

41. An optical rotary encoder device comprising:

a disk which has a signal generating face shaped as a single ring consisting essentially of first and second regions formed along the peripheral direction of the disk, the first regions including first sections which have a predetermined optical modulation rate and second sections which have an optical modulation rate smaller than the optical modulation rate of the first sections;

a light projection/reception section which is positioned so as to face said disk and projects and receives light onto and from said signal generating face on said disk;

a rotating mechanism which rotates said disk and said light projection/reception section relatively; and wherein said second regions have an optical modulation rate different from the optical modulation rates of said first sections and said second sections of said first regions.

42. The optical rotary encoder device of claim 41 wherein said first sections and said second sections are formed in groups, and wherein an angular extent of said groups of first sections along the peripheral direction of the disk is the same as an angular extent of said groups of second sections along the peripheral direction of the disk.

43. The optical rotary encoder device of claim 42 wherein each of said second regions is positioned between two adjacent ones of said first and second sections.

44. The optical rotary encoder device of claim 41 wherein each of said second regions is positioned between two adjacent ones of said first and second sections.

\* \* \* \* \*